Patented Aug. 20, 1940

2,212,162

UNITED STATES PATENT OFFICE 2,212,162

METHOD OF MAKING GLASS COATED ARTICLES

Jesse T. Littleton, Corning, N. Y., assignor to Corning Glass Works, Corning, N. Y., a corporation of New York No Drawing. Application January 6, 1938, Serial No. 183,737

2 Claims. (Cl. 91—70)

The present invention relates to glass coated metallic articles and methods of coating the same.

In the past it has been common practice to employ metallic screens for various purposes such, for example, as the filtering of fluids and also in certain forms of vacuum tube structures. It has also been common practice to employ sintered glass and other forms of all glass structures as well as platinum gauze screens for use in filtering acids and other similar materials having a corrosive effect on most metals. It is rather difficult to produce quantities of all glass filters having uniform filtering characteristics; while owing to their high cost the use of platinum filters is quite limited.

The object of the present invention is an improved form of article which may be economically manufactured and which is suitable for, but not necessarily limited to the above mentioned uses.

The invention embodies a screen of wire of any desired mesh the individual wires of which are coated with a film of glass.

One method of coating consists in dipping a screen into a bath of molten glass of low viscosity and draining off the surplus glass in a hot chamber, leaving the wire embedded in a film or casing of glass.

In case a very fine mesh screen is to be coated the foregoing process may be followed by subjecting the screen to a flame in order to remove any films of glass bridging adjacent wires thereof.

As an alternative to the foregoing methods the screen, after withdrawal from the molten glass, may be cleared of surplus glass by simply subjecting it directly to the action of a suitable flame.

I claim:

1. The method of manufacture of a screen suitable for filtering acids and similar corrosive materials, which includes submerging a metallic screen into a bath of molten glass, withdrawing the coated screen therefrom, draining surplus glass from the screen in a heated chamber and opening up any mesh bridged by a film of glass by playing a flame thereon.

2. The method of manufacture of a glass coated perforate screen which includes submerging a perforate metallic screen into a bath of molten glass, withdrawing the coated screen therefrom and draining and applying heat thereto as required to open up any mesh bridged by a film of glass.

JESSE T. LITTLETON.